Patented Jan. 9, 1951

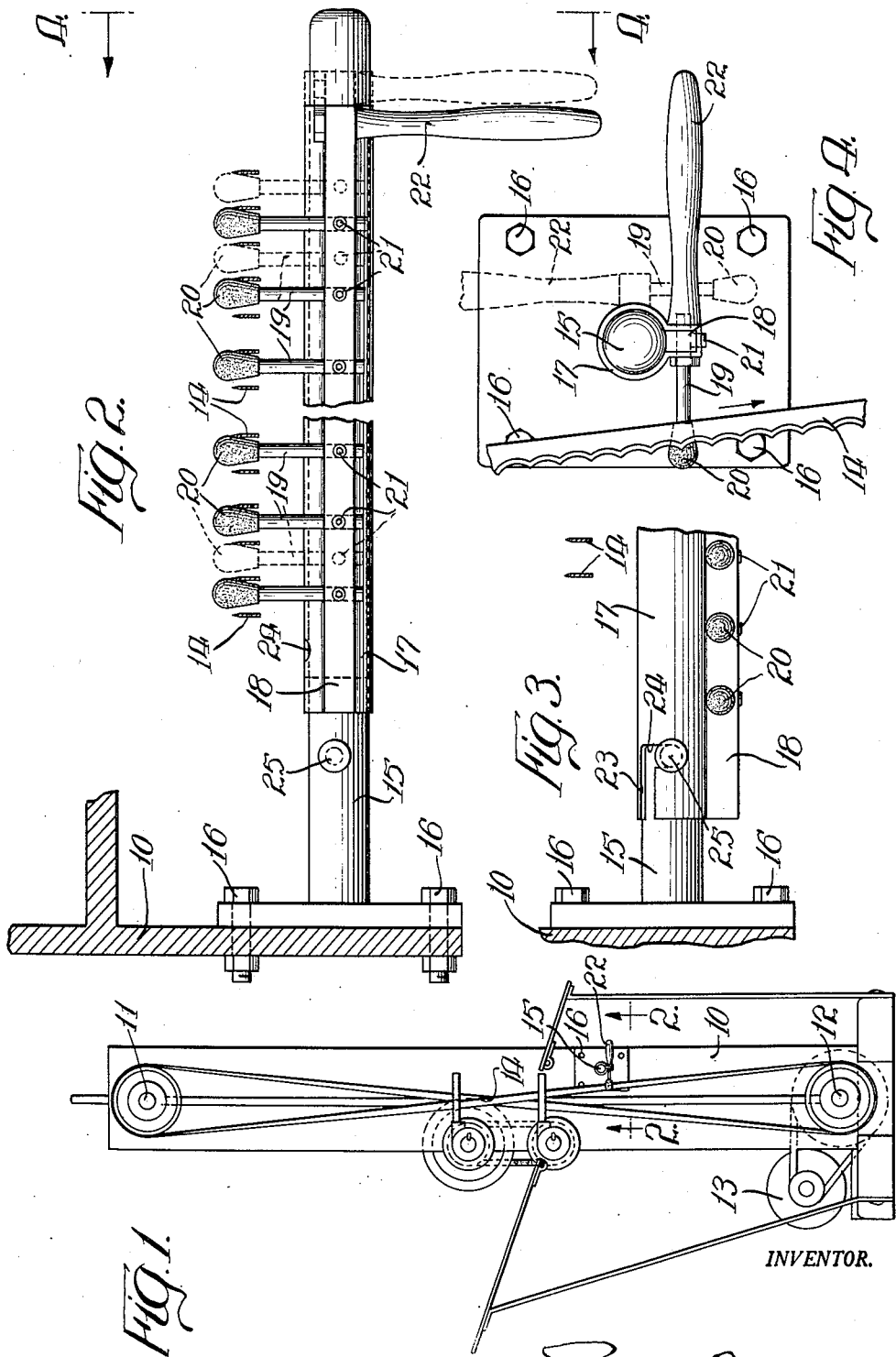

2,537,512

UNITED STATES PATENT OFFICE 2,537,512

SHARPENING ATTACHMENT FOR MULTIPLE ROTARY BAND CUTTERS

Paul Crissey, Geneva, Ill.

Application May 17, 1949, Serial No. 93,692

4 Claims. (Cl. 51—250)

This invention relates to an attachment for machines in which multiple rotary band cutters or knives operate in conjunction with an article to be severed into a plurality of pieces thereby, such as a bread slicing machine, and more particularly an attachment for sharpening the cutters featuring a series of sharpening stones fixed in spaced parallel relation along the path of the cutters by means of a holder mounted on a stationary mount for swinging movement about said mount as an axis toward and away from a position of engagement with a selected plurality of said cutters and for movement in selected planes angularly of said axis of swinging movement.

The general object of this invention is to provide a sharpening device for cutters or knives of a machine of this type through which the blades may be touched up or sharpened without necessitating removal of the blades from an operative position on the machine, thus making it convenient to service and maintain the cutters, as required, without interrupting the operation of the machine.

Another object of the invention is to provide a device of this character which is very simple in construction and easy to operate.

With these and other objects not specifically mentioned in view, the invention consists in certain constructions and combinations hereinafter fully described and then specifically set forth in the claims appended hereto.

In the drawings:

Fig. 1 is a side elevational view of a bread slicing unit of typical design and construction illustrating a machine of the character with which the invention is adapted to cooperate.

Fig. 2 is an enlarged bottom plan view taken on a plane indicated by arrows 2—2 of Fig. 1 with the sharpening stones in operative position.

Fig. 3 is a fragmentary view like Fig. 2 but showing the sharpener in inoperative position.

Fig. 4 is an end view in the direction of the arrows 4—4 on Fig. 2.

In the above mentioned drawings, only one embodiment of the invention has been shown, which is deemed preferable, but it is to be understood that changes and modifications may be made within the scope of the appended claims without departing from the spirit of the invention.

In said drawings, the attachment forming the subject of this invention, is shown in connection with a typical bread slicing machine including a frame 10 on which a pair of cylindrical pulleys or rotors 11 and 12 are supported in vertically spaced and aligned relation, which pulleys are driven by a motor 13. A series of cutters or knives in the form of crenated bands 14, preferably crossed in figure 8 form as shown in Fig. 1, are trained about said pulleys for movement therewith in paths selected in accordance with the spacing between slices of the bread loaf to be operated upon. In a machine as shown in Fig. 1, the material to be cut by said knives or blades travels from left to right of the machine as shown in said Fig. 1 and the cutting edges of said bands 14 are accordingly presented toward the left of Fig. 1 corresponding to the direction from which the material approaches said blades.

The sharpening attachment contemplated by this invention consists of a cylindrical shaft 15 suitably fastened as at 16 to the upright frame 10 with its longitudinal axis parallel to the axes of said pulleys 11 and 12 and spaced rearwardly of the unsharpened edges of the bands 14 where said bands present their flat sides in parallel planes at right angles to the axes of the pulleys 11 and 12. The shaft 15 supports a sleeve 17 having loose telescoping fit thereover whereby said sleeve is movable axially of the shaft and also angularly about the shaft 15 as an axis. The sleeve 17 is equipped with a longitudinal wing member 18 in radially offset relation to the sleeve, said wing member being provided with a series of openings extending axially parallel to the flat sides of the bands 14. These openings provide sockets in which a series of stems or shanks 19 are individually adjustably mounted by means of lock screws 21 whereby a sharpening stone 20 carried at the outer end of each of said stems together form a row of sharpening stones in spaced parallel relation to the sleeve 17 and in spaced apart relation lengthwise of the sleeve in selected symmetry with the spacing between the bands 14 of the machine. As shown in Fig. 2 the stones 20 are of bulbular design although various other suitable shapes may be substituted therefor, provided the stone is of a transverse dimension having clearance between neighboring bands 14.

Thus by turning the sleeve 17 to an angular position wherein said sharpener stones 20 occupy a position between selected bands 14 the sleeve 17 may be moved lengthwise of the shaft 15 to cause the stones 20 to engage corresponding sides of the bands 14 adjacent thereto and then moved lengthwise of the shaft 15 to cause the stones 20 to engage other corresponding sides of the bands 14 adjacent thereto. To facilitate manipulation of the sleeve 17, the end thereof remote from the fastened end is equipped with a handle 22.

The end of the sleeve 17 at the fastened end of the shaft 15 is provided with a notch having a portion 23 extending longitudinally inwardly from the edge of the sleeve and a branch portion 24 extending transversely and forming a continuation thereof which is adapted to be moved into interlocking engagement with a pin or stud 25 secured to the shaft 15 by rotation of the sleeve to a position wherein said sharpener stones 20 are moved into an inoperative position at approximately 90 degrees angle away from their operative position when intermediate of said bands 14.

What is claimed is:

1. An attachment for machines having series of band blades travelling continuously about spaced parallel rotors comprising in combination a stationary shaft supported in spaced parallel relation to the axes of said rotors, a sleeve mounted thereon for swinging motion and longitudinal shifting motion relative to said shaft, and abrasive headed stems fastened to said sleeve in aligned spaced apart relation lengthwise of said sleeve for movement toward and away from a position wherein said blades are engageable with said abrasive headed stems.

2. An attachment as described in claim 1 wherein interlocking means on said sleeve and shaft operate to releasably retain said abrasive headed stems in inoperative position relative to said blades.

3. An attachment as described in claim 1 wherein said sleeve is provided with a longitudinally extending radially projecting web provided with holes in spaced apart relation lengthwise of said web in which said stems are adjustably fastened.

4. An attachment for machines having a series of band blades travelling continuously about spaced parallel rotors comprising in combination a stationary mount supported in spaced parallel relation to the axes of said rotors, a holder mounted thereon for swinging motion about the mount as an axis and for shifting motion longitudinally of said axis, and abrasive headed stems fastened to said holder in aligned spaced apart relation lengthwise of said holder for movement toward and away from a position wherein said blades are engageable with said abrasive headed stems.

PAUL CRISSEY.

REFERENCES CITED

The following references are of record in the file of this patent:

UNITED STATES PATENTS

| Number | Name | Date |
|---|---|---|
| 432,660 | Beyer | July 22, 1890 |
| 446,803 | Watson | Feb. 17, 1891 |
| 894,747 | Ringland | July 28, 1908 |
| 1,826,517 | Klockner et al. | Oct. 6, 1931 |